United States Patent
Nelson, Jr.

(10) Patent No.: US 6,722,297 B1
(45) Date of Patent: Apr. 20, 2004

(54) MACHINE FOR PLANTING GRASS SPRIGS

(76) Inventor: Frederick S. Nelson, Jr., 10454 S. Jamestown, Tulsa, OK (US) 74137

(*) Notice: Subject to any disclaimer, the term of this patent is extended or adjusted under 35 U.S.C. 154(b) by 0 days.

(21) Appl. No.: 10/378,529

(22) Filed: Mar. 3, 2003

(51) Int. Cl.⁷ ............................................. A01C 11/00
(52) U.S. Cl. ..................... 111/104; 111/100; 111/901
(58) Field of Search .................. 111/100, 101, 111/104, 105, 107, 109, 114, 199, 200, 901; 83/325, 331, 509, 863, 865; 172/20, 721, 732, 733

(56) References Cited

U.S. PATENT DOCUMENTS

| | | |
|---|---|---|
| 262,439 A | 8/1882 | Lindsay et al. |
| 376,243 A | 1/1888 | Guilmartin |
| 2,684,781 A | 7/1954 | Allen et al. |
| 2,715,882 A | 8/1955 | Overstreet, Jr. |
| 3,026,001 A | 3/1962 | Landgraf |
| 3,159,121 A | 12/1964 | Beck, Jr. |
| 3,187,698 A | 6/1965 | Murray |
| 3,903,816 A | 9/1975 | Brem |
| 3,939,785 A | 2/1976 | Duffy |
| 5,351,634 A | 10/1994 | Patton |
| 5,417,293 A | 5/1995 | Leader |
| 6,223,662 B1 * | 5/2001 | Lastinger et al. ........... 111/104 |

* cited by examiner

Primary Examiner—Robert E. Pezzuto
(74) Attorney, Agent, or Firm—Gable & Gotwals; Paul H. Johnson (57) ABSTRACT

A machine for planting grass sprigs having a superstructure supported on wheels for moving over the earth's surface a sprig storage bin supported by the superstructure, a distributor for moving grass sprigs contained within the storage bin towards an opening in the floor surface, a plurality of paralleled discharge troughs each having a wide upper open end for receiving grass sprigs therein from the sprig storage bin and a reduced width lower opening providing a relatively narrow discharge slot through which grass sprigs are deposited in an in-line pattern on the earth's surface, trenching disc in alignment with each discharge trough for forming a narrow trench in the earth's surface upon which grass sprigs are deposited, and a planting disc in alignment with and rearwardly of each discharge trough for forcing grass sprigs into the narrow trenches.

9 Claims, 11 Drawing Sheets

MACHINE FOR PLANTING GRASS SPRIGS

REFERENCE TO PENDING APPLICATIONS

This application is not related to any pending United States or foreign patent application.

REFERENCE TO MICROFICHE APPENDIX

This application is not referenced in any microfiche appendix.

FIELD OF THE INVENTION

This invention relates to a machine for planting grass sprigs.

BACKGROUND OF THE INVENTION

Grass is probably the most important type of vegetation and certainly exceeds in value forestry products, fruit trees and row crops. Much of the grain consumed in the world, such as wheat, oats, rye, rice and so forth is the result of seeds produced from grass-like plants. In addition to food-producing grass-like plants, an important aspect of grass is production of fodder—that is, food that is consumed essentially by livestock rather than directly by humans.

In addition to providing food, grass is exceedingly important in landscaping in which grass surfaces are not fostered essentially for production of food, either for humans or for animals, but as a protective surface for parts of the earth. Lawns, parks, golf courses, and so forth are possible only because of grass surfaces. Some lawn grass can be propagated by planting seeds, rye grass and fescue being common examples. On the other hand, there are types of lawn grass that are not well adapted for propagation by seeds. The exceedingly popular lawn grass, Bermuda, being a prime example. Bermuda and other similar types of grasses are most commonly propagated by planting sprigs. Bermuda and similar grasses have long runners that produce tentacles that can take root and grow. Portions of the runners produced by Bermuda are calls "sprigs." Propagating Bermuda by spreading these portions of runners is called "sprigging."

To plant grass from sprigs, the common procedure is plow or dig up sod that is an inch or two of soil having the Bermuda grass thereon. Sod includes grass plus the top layer of the soil that produced the grass. The sod is then broken up into small bits and pieces each having a portion of a runner.

The most common way of planting grass sprigs is to form paralleled furrows or slits in the ground surface. Sprigs of grass are then placed into these furrows or slits. For this purpose, grass sprigging equipment has been designed and used for many years. This invention is an improved machine for planting grass sprigs.

For additional background information relating to grass sprigging and particularly to machines for planting grass sprigs, reference may be had to the following previously issued United States patents:

| U.S. Pat. No. | Inventor(s) | Title |
| --- | --- | --- |
| 262,439 | Lindsay, et al. | Corn Planter |
| 376,243 | Guilmartin | Seed Planter |

States patents:

| U.S. Pat. No. | Inventor(s) | Title |
| --- | --- | --- |
| 2,684,781 | Allen, et al. | Seed Planter |
| 2,715,882 | Overstreet, Jr. | Grass Planting Machine |
| 3,026,001 | Landgraf | Grass Root Planter |
| 3,159,121 | Beck, Jr. | Grass Planter |
| 3,187,698 | Murray | Grass Sprig Setter |
| 3,903,816 | Brem | Method and Means of Producing Grass Sod |
| 3,939,785 | Duffy | Sprig Planting Apparatus |
| 5,351,634 | Patton | Grass Planter |
| 5,417,293 | Leader | Single Pass Continuous Feed Sprigger |

BRIEF SUMMARY OF THE INVENTION

The invention herein is a machine for planting grass sprigs into the surface of the earth. The machine includes a super-structure—that is, a frame having front and back wheels. The front wheels are pivoted relative to the back wheels so that the frame can be guided in a forward direction of travel over the earth's surface. The frame can be self-propelled, however, in the most common application of the invention, the frame or super-structure is designed to be pulled behind a tractor so that a separate engine may not be required on the super-structure itself.

A sprig storage bin is supported by the super-structure and typically has a large open top in which grass sprigs can be dumped, such as by use of a front-end loader. The sprig storage bin has an opening in a floor surface through which grass sprigs can fall. Typically, the opening is in a forward portion of the sprig storage bin.

A distributor system is provided for moving grass sprigs contained within the storage bin towards the floor surface opening so that grass sprigs are constantly available for passing downwardly through the floor surface opening in a substantially continuous process while the super-structure is being moved forwardly and grass is being planted. A plurality of grass discharge troughs are positioned below the opening in the floor surface. Each grass discharge trough is formed of a pair of spaced-apart wide downwardly inclined moving belts. The belts are supported in a V-shape pattern providing a relatively wide inlet upper space between belts. The belts taper downwardly towards each other to provide a relatively narrow, elongated discharge slot. The discharge slots of the troughs are in alignment with the super-structure direction of travel.

The discharge slot of each of the troughs is spaced in close proximity to the surface of the earth when sprigs are being planted.

Grass sprigs from the storage bin pass downwardly through the opening in the floor thereof and into the wide inlet opening of each of the troughs. Opposed rotating belts move the grass clipping downwardly into the narrow slot forming the outlet of each trough. The sprigs are carried downwardly by the moving distributor belts to deposit grass sprigs in paralleled in-line patterns on the earth's surface.

A trenching disc is carried by the super-structure for each of the discharge troughs. The trenching disc is in line with and forward of each discharge trough and forms a narrow trench in the earth's surface as moved along with the super-structure. Specifically, the trench formed by each trenching disc is in alignment with and in advance of the in-line pattern in which the grass sprigs are deposited on the earth's surface by the discharge troughs. In operation, the in-line pattern of grass sprigs deposited from each discharge trough is on top of the narrow trench formed by the trenching disc associated with each discharge trough.

There is provided at least one planting disc carried by the super-structure that is in alignment with and spaced rearwardly of each discharge trough. As the in-line pattern of deposited grass sprigs are continuously discharged onto the earth's surface a planting disc forces the grass sprigs into the trench formed by the trenching disc.

Thus, the trenching machine includes provision for creating a plurality of parallel spaced-apart narrow trenches, depositing a narrow pattern of grass sprigs on top of each of the trenches, and engaging the deposited grass sprigs with a planting disc or discs to force the grass sprigs into each of the trenches.

More details of the invention and a better understanding of the machine for planting grass sprigs will be obtained from the following detailed description of the preferred embodiment, taken in conjunction with the claims and the attached drawings.

BRIEF DESCRIPTION OF THE DRAWINGS

FIG. 2 is an elevational side view of the opposite side of the machine for planting grass sprigs of FIG. 1. Both FIGS. 1 and 2 show the machine in the position wherein the sprigger assembly is raised above the earth's surface, which is the condition when the grass sprigging machine is being moved from one location to another and when grass sprigs are not being planted.

FIG. 12 is a partial elevational side view of the sprig agitator as seen in FIG. 11, FIG. 12 being taken along the line 12—12 of FIG. 11. In FIG. 12, the agitator mechanism is shown without the supporting structure.

DETAILED DESCRIPTION OF THE PREFERRED EMBODIMENTS

It is understood that the invention is not limited to the details of construction and arrangement of parts illustrated in the accompanying drawings. The invention is capable of other embodiments and of being practiced or carried out in a variety of ways. The phraseology and terminology employed herein are for the purpose of description and not of limitation.

Figure 1:
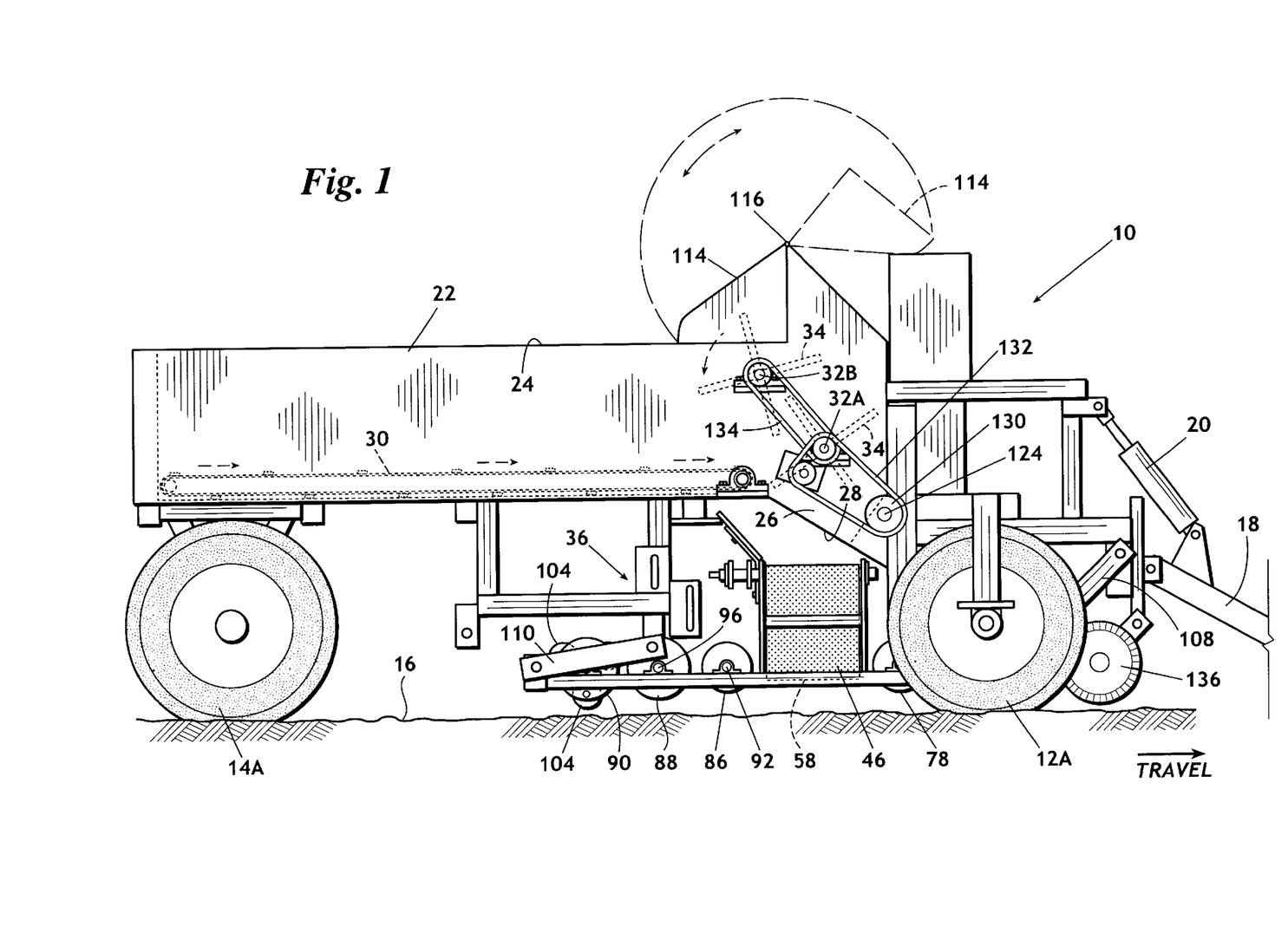
FIG. 1 is an elevational side view of a machine for planting grass sprigs according to this invention. The machine illustrated is of the type designed to be pulled behind a tractor.
Figure 2:
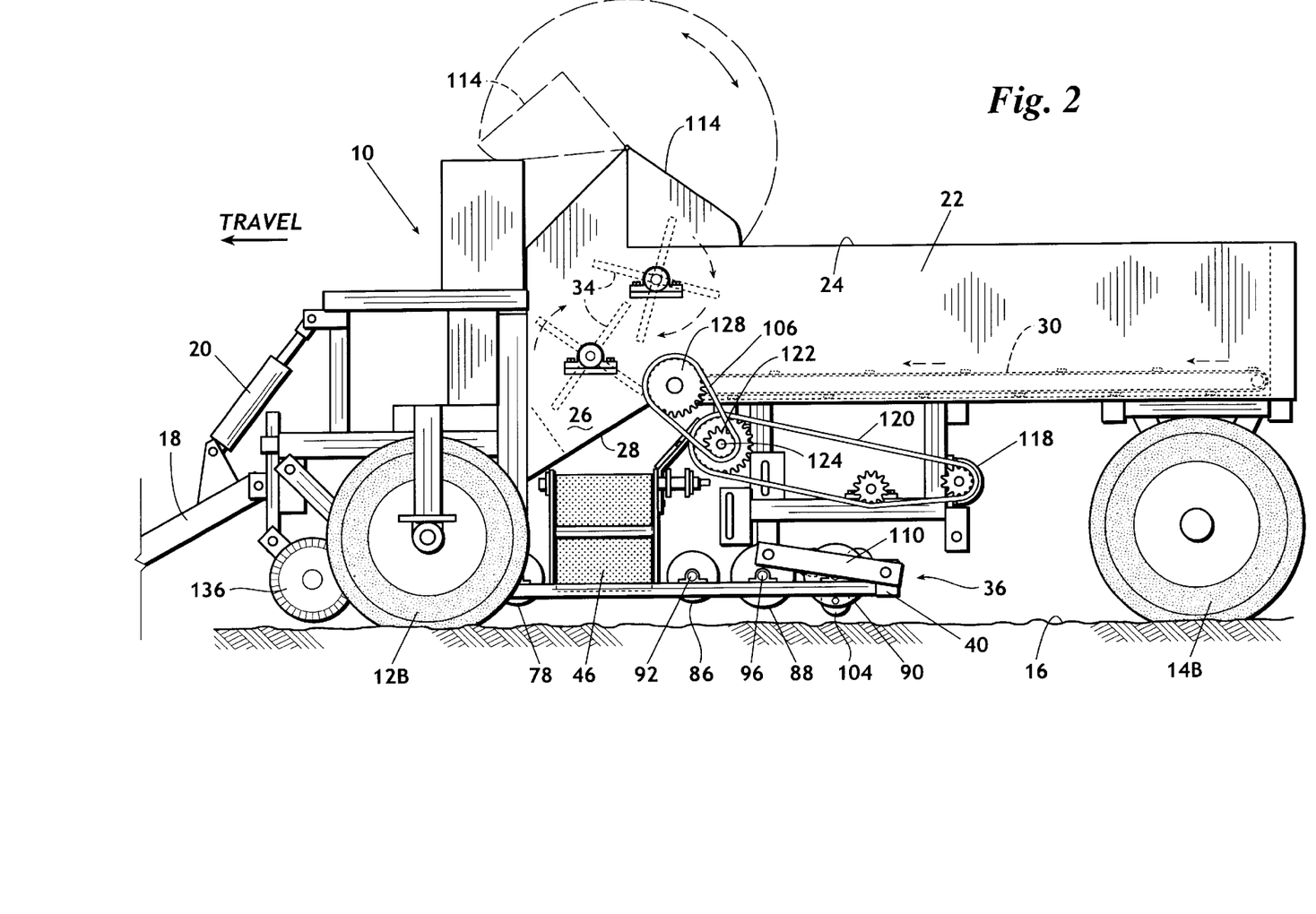

Referring to the drawings and first to FIGS. 1 and 2, a machine for planting grass sprigs that incorporates the principles of this invention is shown. FIG. 1 shows the right-hand side of the machine, FIG. 2, the left-hand side. The grass-planting machine includes a super-structure generally indicated by the numeral 10 that includes a framework by which the components of the machine are related to each other. Forward wheels 12A and 12B and rearward wheels 14A and 14B support super-structure 10 on the earth's surface 16. While the super-structure 10 could be self-propelled—that is, have an engine and mechanisms for guiding the front wheels 12A and 12B, in the typical application of the invention and as illustrated in the drawings, the super-structure 10 is designed to be pulled by a tractor. For this purpose a tongue 18 extends from a forward end of super-structure 10. Tongue 18 is shown in a position indicating that it is not attached to a tractor, but can be elevated such as by means of a hydraulic cylinder 20 to permit the forward end of the tongue (not seen) to be attached to a tractor.

Supported on super-structure 10 is a sprig storage bin 2 that is typically a large rectangular box-like container with an upper open top 24 into which grass sprigs can be dumped, such as by means of a front-end loader or the like. The grass sprigs of the type that can be planted by the machine of this invention typically are derived from grass sod that is removed from the earth's surface. Sod usually includes an inch or two of earth, plus the grass that has grown on the removed sod. After chunks of the sod are removed, it is broken up into small pieces that include primarily grass runners having roots thereon and some earth. That is, the best grass sprigs typically include some dirt or earth since the grass sprigs must be alive and viable at the time they are planted.

Sprig storage bin 22 includes a forward portion that is inclined downwardly. The downwardly inclined portion 26 has an open bottom 28. Positioned within the interior of sprig storage bin 22 is a conveyor 30 that preferably extends substantially the width and length of the storage bin and which is powered to move grass sprigs from within the bin towards the open bottom 28.

To break up grass sod to form individual clumps or sprigs, shafts 32A and 32B have radial arms 34.

Figure 3:
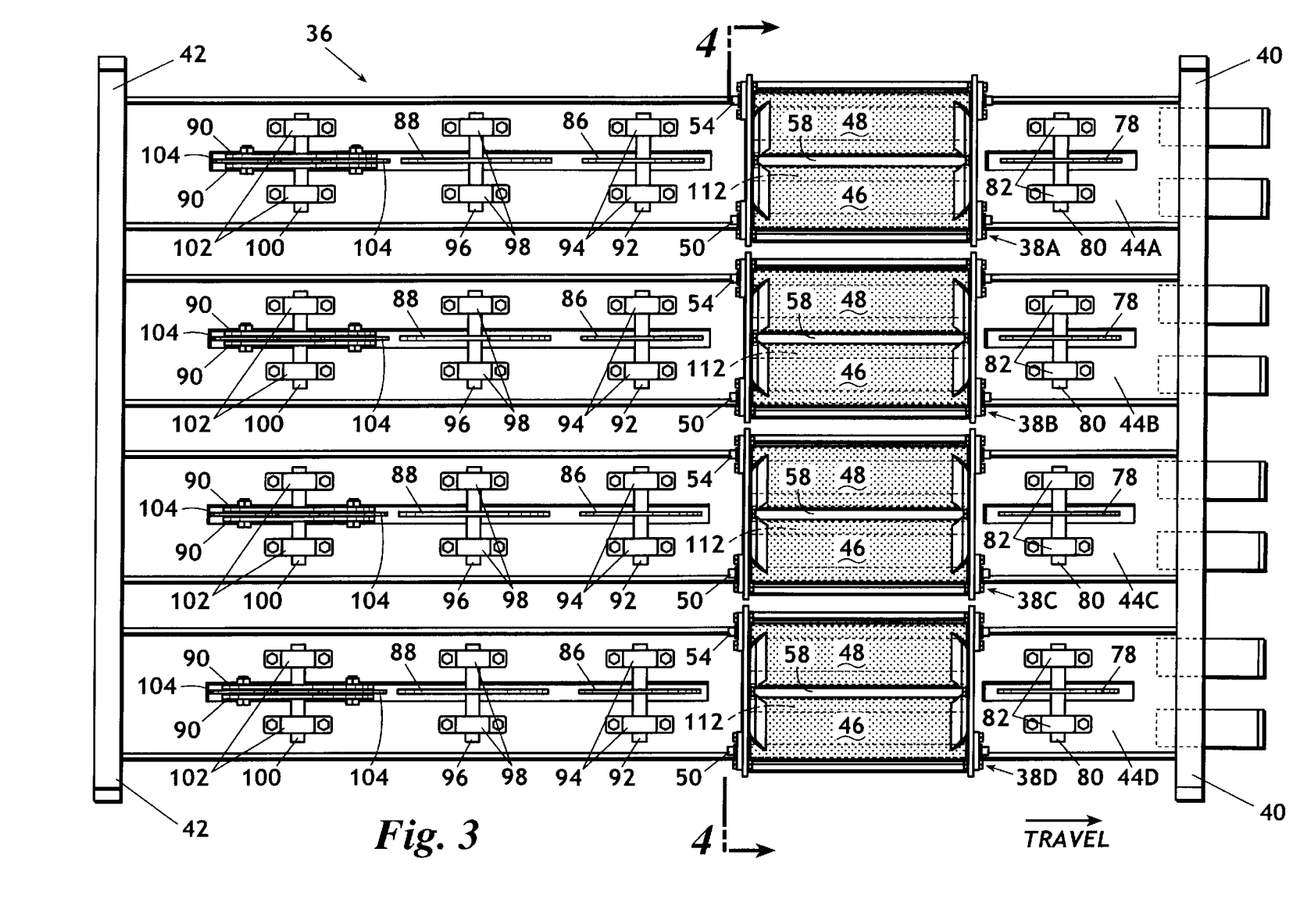
FIG. 3 is a fragmentary plan view of the sprigger assembly that is elevationally supported below the main portion of the machine super-structure.

Supported below super-structure 10 there is a sprigger assembly 36, the top view of which is seen in FIG. 3. This view shows four grass discharge troughs 38A through 38D. The frame of sprigger assembly 36 includes a forward beam 40 and a rearward beam 42, the beams being spaced apart from each other and oriented transverse to the direction of travel of the sprigger super-structure. Extending between beams 40 and 42 are plates 44A through 44D that support grass discharge troughs 38A through 38D.

Figure 4:
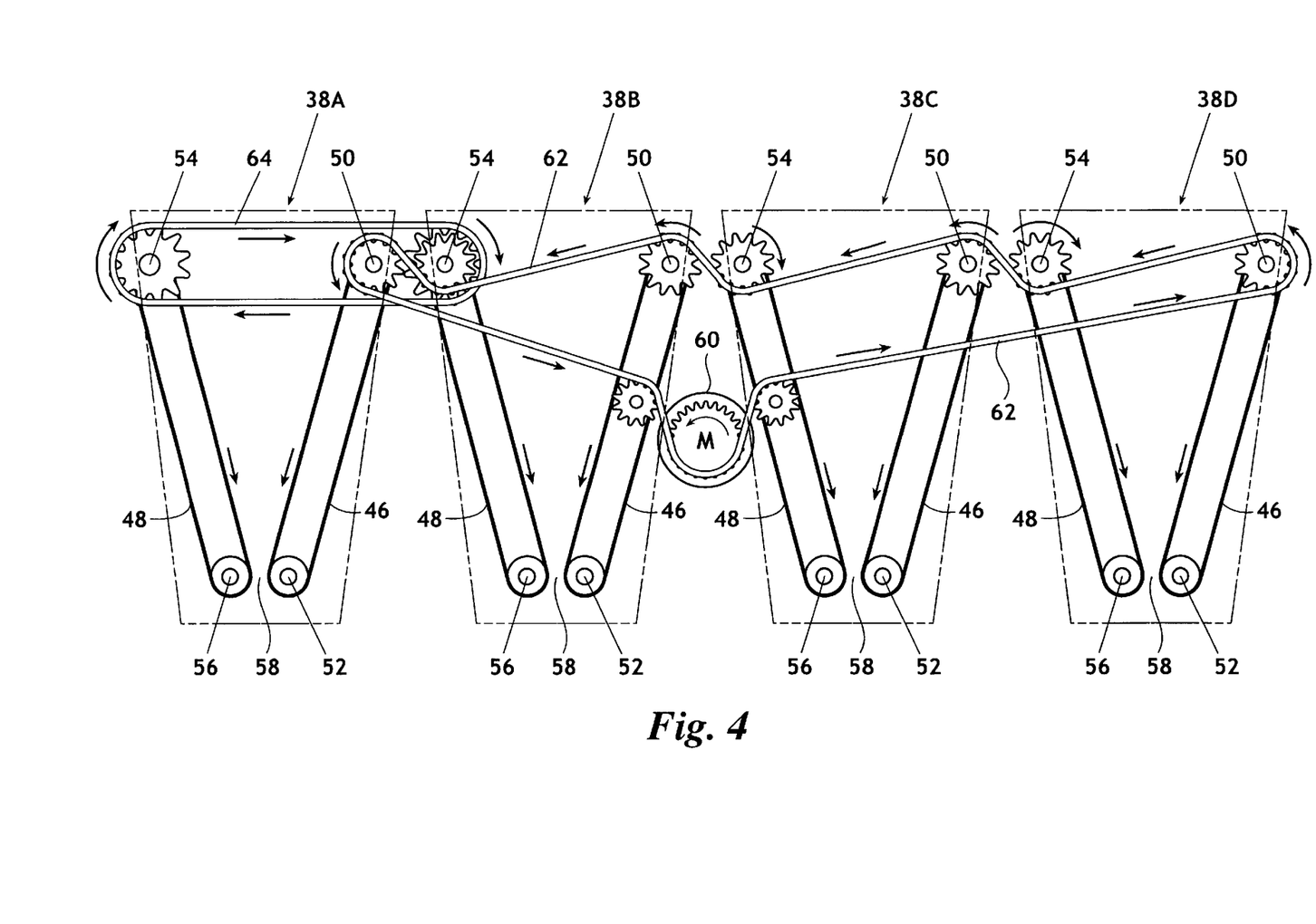
FIG. 4 is an elevational cross-sectional view taken along the line 4—4 of FIG. 3 showing the arrangement of four discharge troughs. This figure shows how the pair of wide belts forming each of the four troughs are rotated from a singular power source.
Figure 5:
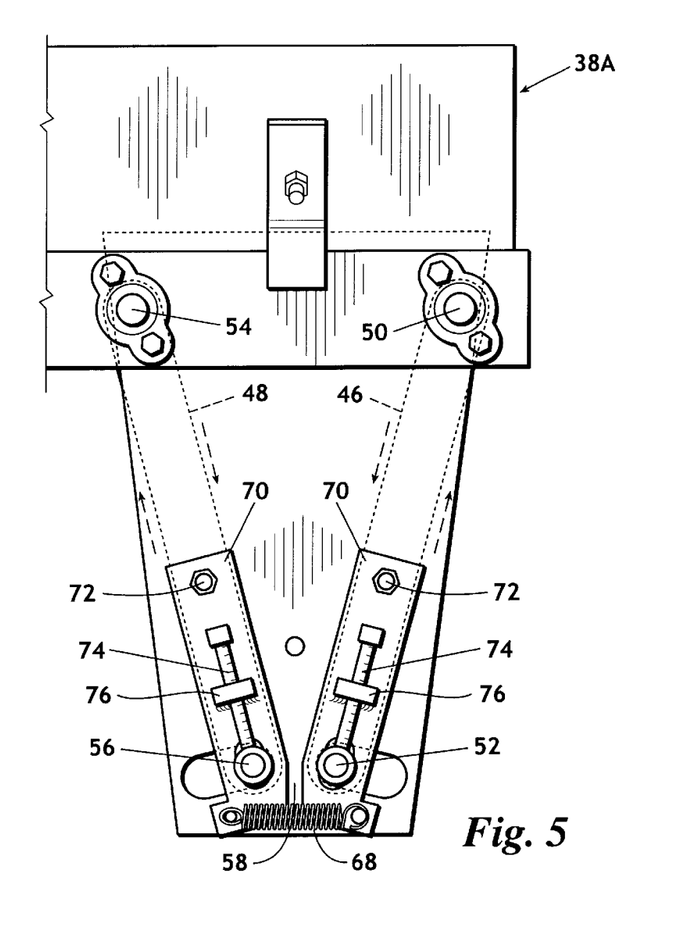
FIG. 5 is an enlarged fragmentary elevational view of the belt systems making up one discharge trough.

Each of the grass discharge troughs 38A through 38D is formed, as best seen in FIGS. 4 and 5, by a first wide belt 46 and a second wide belt 48. First belt 46 is rotatably supported between a first or upper axle 50 and a second or lower axle 52. In like manner, the second wide belt 48 of each of the troughs is rotatably supported between an upper axle 54 and a lower axle 56. The belts 46 and 48 of each of the troughs moves in the direction as shown by the arrows—that is, the inside loop of each belt in a pair forming a grass discharge trough moves downwardly so that thereby grass discharge troughs 38A through 38D are designed to carry grass sprigs downwardly. The upper axles 50 and 54 are spaced wide apart providing a wide rectangular open top to each of the troughs 38A through 38D in which grass sprigs are deposited. The spacing between the lower axles 52 and 56 is substantially reduced providing at the lower end of each trough a narrow slot 58 from which grass sprigs are discharged and deposited on the earth's surface. Slots 85 are, when grass is being planted, such as seen in dotted outline of FIG. 7, close to the earth's surface 16 so that thereby an elongated narrow pattern of grass sprigs is deposited upon the earth's surface 16 by each of the grass discharge troughs 38A–38D.

The pairs of wide belts 46 and 48 making up each of the discharge troughs are rotated by power supplied by a hydraulic motor 60 as seen in FIG. 4. Motor 60 drives an elongated flexible belt 62 that extends around sprockets affixed to axles 50 and 54 of each of the discharge troughs. In the illustrated arrangement the sprigger machine has four troughs that deposit four narrow paralleled patterns of grass sprigs as the sprigger machine moves along. Thus, there are a total of eight upper axles 50 and 54 that are driven by rotative energy supplied by a hydraulic motor 60. In the illustrated belt arrangement of FIG. 4, one supplementary belt 64 is employed.

Figure 6:
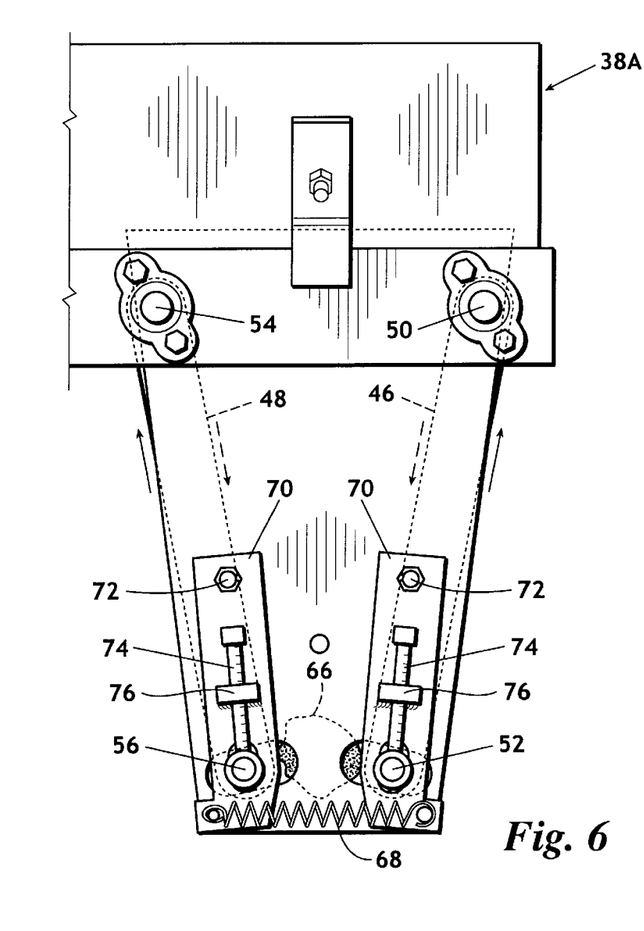
FIG. 6 is a view as in FIG. 5, but shows a large object such as a rock, large clod or a large chunk of grass sod that moves downwardly within a discharge trough and shows how the lower ends of the belt systems are resiliently expanded to permit passage of large objects that are of greater dimension than normal grass sprigs.

As previously described, grass sprigs are typically obtained by first cutting grass sod in strips from the surface of the earth. This grass sod is broken up to provide small, discreet pieces of grass sprigs that are carried in sprig storage bin 22. In the process of preparing the grass sprigs for planting, large pieces of grass sod may remain intact and in addition, rocks are sometimes included as the grass sod is removed from the earth's surface. FIGS. 5 and 6 show the mechanism by which a large object, such as a rock, indicated in dotted outline and identified by the numeral 66 in FIG. 6 is accommodated by the troughs in a way to prevent damage to the troughs. As seen in FIGS. 5 and 6, the lower axles 52 and 56 of each trough (such as trough 38A, as illustrated in FIGS. 5 and 6) are laterally displaceable and are restrained in positions adjacent each other to provide the narrow slot 58 by means of a tension spring 68. Spring 68, in normal operations, retains axles 52 and 56 adjacent each other to provide the narrow slot 58 through which grass sprigs are deposited in a narrow pattern on the earth's surface. However, when a large object, such as a large chunk of sod, or a rock 66 is passed downwardly from the sprig storage bin 22 into a trough, the lower axles 52 and 56 can spread apart from each other as shown, extending tension spring 68 to allow the large object to pass, after which the axles 52 and 56 are immediately retracted towards each other to provide the narrow slot 58.

Further, as seen in FIGS. 5 and 6, each of the lower axles 52 and 56 is supported by a pivotal plate 70, each of the plates 70 being pivoted about a bolt 72. Each plate 70 rotatably supports a lower axle 52 or 56. A tension adjustment bolt 74 extends threadably through a nut 76 welded to pivotal plate 70 so that thereby the tension on belts 46 and 48 can be adjusted.

In order to plant grass sprigs in the earth, it is necessary that a trench be formed to receive the sprigs and that the sprigs be forced into the trench. The system by which this is accomplished is best seen in FIGS. 3, 7, 8 and 9. FIG. 3 shows a trenching disc 78 positioned in alignment with and in advance of each narrow slot 58 from which grass sprigs are discharged by each of the grass discharge troughs 38A through 38D. Each trenching disc 78 is supported about a shaft 80 held by bearings 82 that are secured to structural plates 44A through 44D. Each of the trenching discs 78 is configured to penetrate the earth's surface 16 and form therein a narrow trench 84 (see FIG. 7). A narrow trench 84 is formed in alignment with a narrow pattern of grass sprigs deposited on the earth's surface from slots 58 of each of the grass discharge troughs 38A through 38D. The narrow trenches 84 are formed below each of the discharge troughs' narrow slots 58 and in advance of the deposit of grass sprigs through the slots as the super-structure 10 is moved over the earth's surface.

Figure 7:
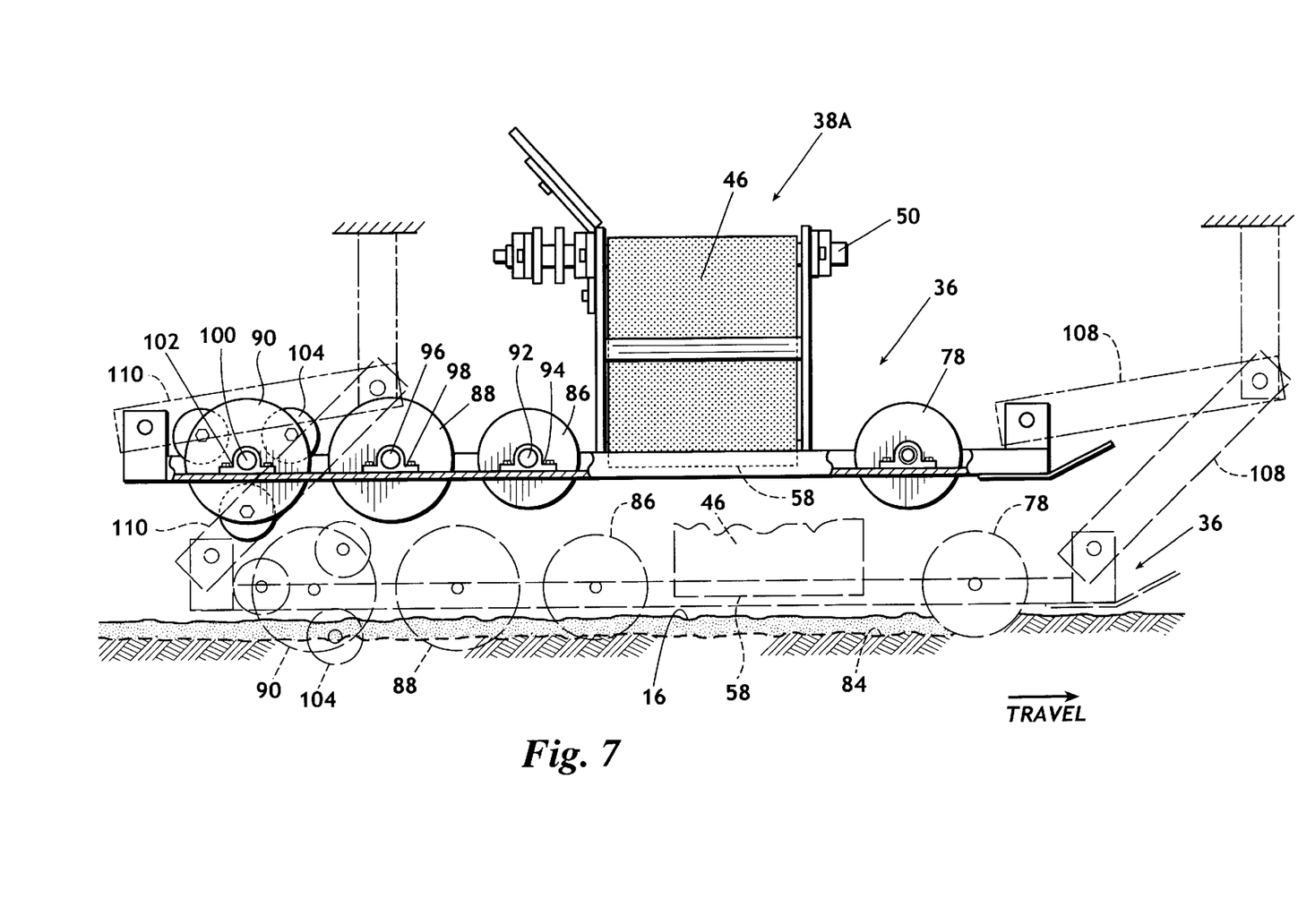
FIG. 7 is an elevational fragmentary view of the sprigger assembly as supported below the main super-structure of the grass-planting machine and shows in solid outline the sprigger assembly raised above the earth's surface as in the position when the super-structure is being moved from one location to another and grass sprigs are not being planted. In dotted outline the sprigger assembly is shown in the lower, operating position, wherein grass sprigs are being planted into the earth's surface.
Figure 8:
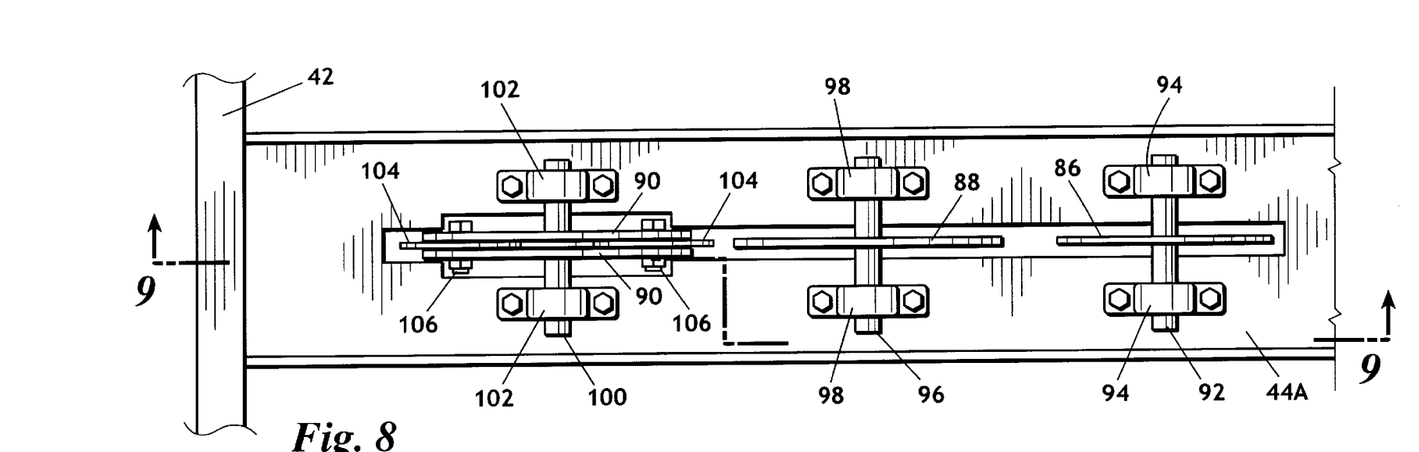
FIG. 8 is a fragmentary top plan view of a portion of the sprigger assembly showing three planting discs mounted in series.
Figure 9:
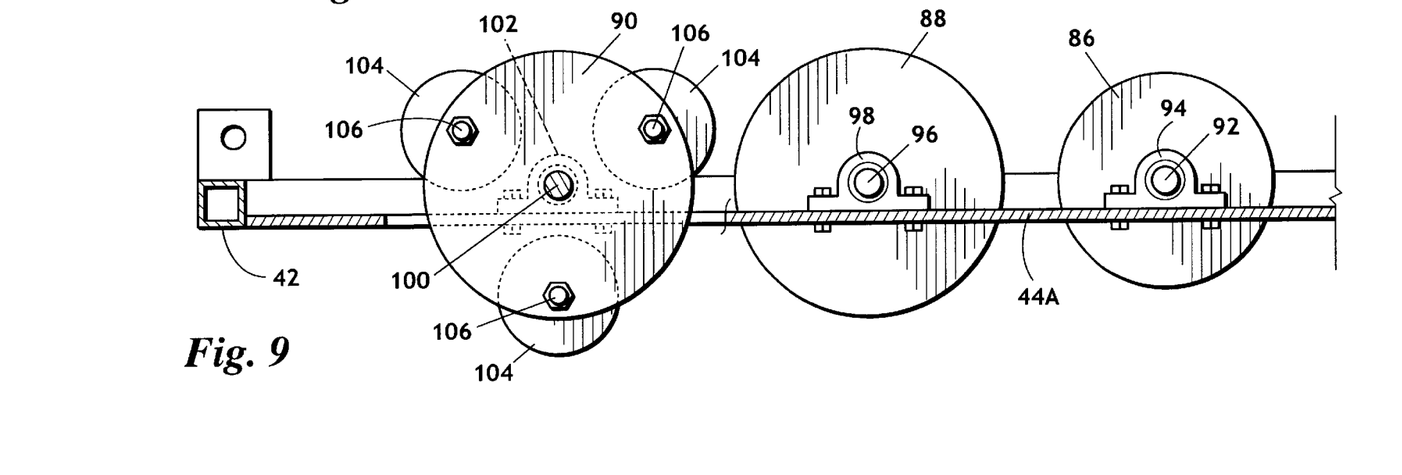
FIG. 9 is a cross-sectional view of the three planting discs as taken along the line 9—9 of FIG. 8.

It is necessary that the grass sprigs deposited through each of slots 58 be forced into the narrow trench 84. For this purpose, the sprigger assembly 38 includes, in alignment with narrow slots 58 and trenching discs 78, a plurality of planting discs including a first planting disc 86, a second planting disc 88 and a third planting disc 90 (see FIGS. 3, 7, 8 and 9). The discs 86, 88 and 90 are, to an extent, redundant since only a single planting disc may suffice to force the grass sprigs into the narrow trench 84. However, it has been learned that a plurality of discs, each of which may have a different thickness from the others, helps ensure that most of the grass sprigs deposited through the narrow slots of the grass discharge troughs are forced into the earth and thereby positioned to receive moisture and nourishment from the earth. FIG. 8 shows first, second and third planting discs 86, 88 and 90 supported on plate 44A that is a part of the structure of sprigger assembly 36. First planting disc 86 is supported by a shaft 92 held by bearings 94. In like manner, second planting disc 88 is supported by shaft 96 held by bearings 98, while the third planting disc 90 is held by shaft 100 supported by bearings 102. Third planting disc 90 has auxiliary features to make certain that the grass sprigs are firmly pressed into the narrow trench 84—that is, third planting disc 90 has affixed to it three small diameter supplemental discs 104. Each supplemental disc 104 is supported about a bolt 106. The third planting disc 90 is, in the illustrated arrangement, in the form of two discs parallel to each other with the supplemental discs 104 supported between adjacent discs. The arrangement of third planting disc 90 (in the form of two parallel discs) with supplemental planting discs 104 serves to force some of the grass sprigs deeper into trench 84 than others, so that thereby a continuous variety of planting depths is achieved to increase the chance of livability of the grass sprigs.

The grass discharge troughs 38A through 38D, the trenching discs 78 and the planting discs 86, 88 and 90 are all supported on the sprigger assembly 36 which is connected below super-structure 10 by an arrangement wherein the elevation of the sprigging assembly relative to the earth's surface can be adjusted. This is accomplished by use of pivot arms 108 and 110 (see FIG. 7). This arrangement allows the sprigging assembly to be elevationally positioned above the earth's surface when the grass sprigger machine super-structure is being moved from one location to another, but during which time grass sprigs are not being planted. Sprigging assembly 36 is swung in an upper position such as by means of a hydraulic cylinder/piston arrangement (not shown) or by a mechanical lifting system (also not shown). In FIG. 7, the sprigging assembly 36 is shown in solid outline in its upward position as it would be placed when the super-structure is being moved but when grass sprigs are not being planted. Shown in dotted outline on FIG. 7 the sprigging assembly 36 is in the downward planting position in which trenching discs 78 penetrates the earth's surface 16 to form narrow trenches and planting discs 86, 88 and 90 are positioned to force grass sprigs into the trenches.

FIG. 3 is a plan view of the sprigging assembly 36 with plates 44A through 44D that supports the discharge troughs 38A through 38D, the trenching discs 78, and the planting discs 86, 88 and 90. Slots or openings are provided in plates 44A through 44D as illustrated. In addition, wider slots 112 are formed in plates 44A through 44D below discharge troughs 38A through 38D and below and in alignment with the narrow slots 58 formed between belts 46 and 48.

FIGS. 1 and 2 show side views of the super-structure with open top sprig storage bin 22. The top edge of the side walls that form sprig storage bin 22 are increased in height in the direction towards the front of the bin. A cover panel 114 encloses radial arms 34 that are moved by shafts 32 to distribute grass sprigs so that they pass downwardly into the open tops of grass discharge troughs 38A through 38D. Cover panel 114 is hinged at 116. Cover panel 114 can be moved into a open position, as shown in dotted outline as FIGS. 1 and 2 during the time that grass sprigs are being loaded into storage bin 22. After the loading procedure is completed, cover panel 114 is swung into the closed position as shown in solid outline in FIGS. 1 and 2, to provide containment for the grass sprigs as they are fluffed about by radial arms 34.

As previously mentioned, there is a conveyor 30 in the bottom interior of sprig storage bin 22. FIGS. 1 and 2 together illustrate an assembly for rotating conveyor 30 and shafts 32 (from which radial arms 34 extend) from a single hydraulic motor 118. A first belt 120 extends to a drive pulley 122 that rotates shaft 124. A second belt 126 extends to pulley 128 which is affixed to a shaft that drives conveyor belt 30. As seen in FIG. 1, shaft 124 extends to the opposite side of the super-structure to engage a pulley 130 that turns a belt 132 which is looped over a pulley attached to shaft 32A. A third belt 134 extends from a pulley around shaft 32A to a pulley around shaft 32B to rotate radial arms 34. In this manner, a single hydraulic motor 118 drives all of the shafts and pulleys necessary to move grass sprigs positioned in sprig storage bin 32 towards the front of the storage bin where the grass sprigs are fluffed, distributed and broken up for deposit directly into the upper open ends of grass discharge troughs 38A through 38D.

While the planting of grass sprigs can be accomplished utilizing trenching discs supported entirely by the sprigger assembly 36, in FIGS. 1 and 2 there is shown a preliminary trenching disc 136 that can be adjustably extended from the machine super-structure. A preliminary disc 136 can be used in alignment with each trenching disc 78. The use of preliminary discs does not change the basic technique or procedure for planting grass sprigs as has been described.

Figure 10:
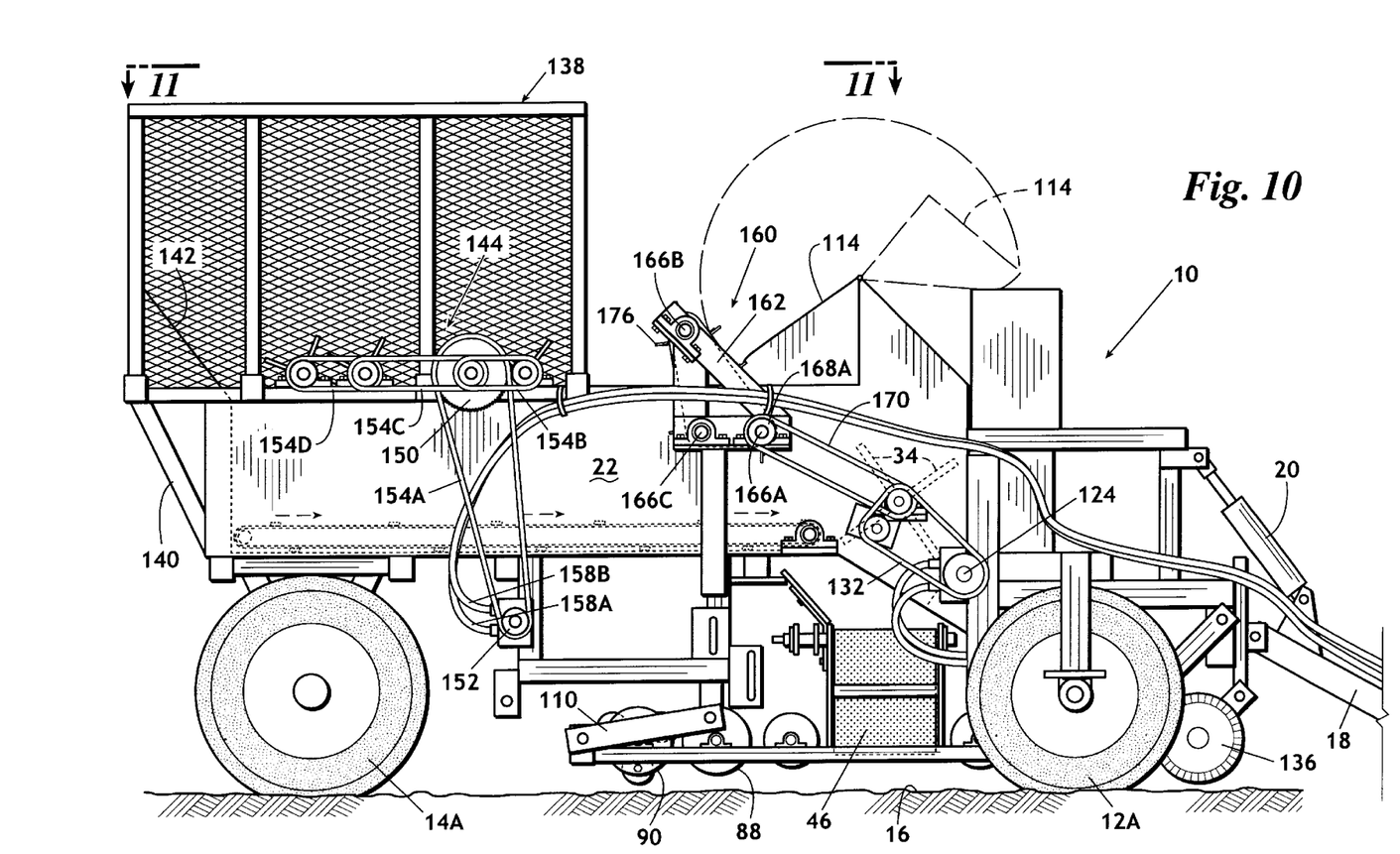
FIG. 10 is an external elevational side view of A Machine For Planting Grass Sprigs. Similar to that illustrated in FIG. 1 except that FIG. 10 shows an improved embodiment including a cage added to the top rear portion of the first sprig storage bin so that a substantially increased quantity of grass sprigs can be transported by the sprigging machine, meaning that the machine need be refilled fewer times for planting a given area of grass.

FIGS. 10–15 illustrate an alternate embodiment of the invention. FIG. 10 is an elevational view of the grass sprigger as shown in FIG. 1 with the improvements added to it, including, most prominently, a large rectangular open-top sprig bin 138. The sprig bin is shown as constructed of metal angle iron with expanded metal sides. The sprig bin 138 rests upon the open top 24 of sprig storage bin 22. In the illustrated arrangement of FIG. 10, sprig bin 138 extends rearwardly of the rearward end of sprig storage bin 22, the rearward end portion being supported by an angle beam 140. To make sure that all grass sprigs deposit in sprig bin 138 ultimately pass downwardly into sprig storage bin 22, an angle plate 142, shown in dotted outline, is employed.

In the improved embodiment of FIGS. 10–15, grass sprigs are dumped into the open top of sprig bin 138 and ultimately pass into sprig storage bin 22 where they are utilized as has been previously described. To augment the distribution of sprigs from sprig bin 138 downwardly into sprig storage bin 22, an agitator system generally indicated with numeral 144 is employed. The agitator system is formed by four horizontal shafts 146A–146D that are rotatably supported at their opposed ends by block bearings secured to the frame of the sprig bin. Horizontal shafts 146A–146D are supported at the bottom of sprig bin 138 and at the top of sprig storage bin 22, the function of agitator system 144 is to distribute sprigs out of sprig bin 138 and into sprig storage bin 22 so that sprigs can ultimately be moved to pass into grass discharge troughs 38A–38D.

Figure 12:
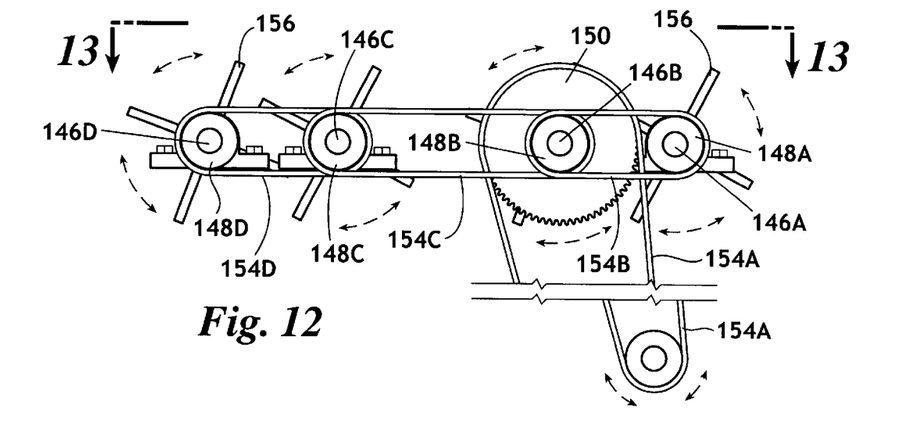
Figure 13:
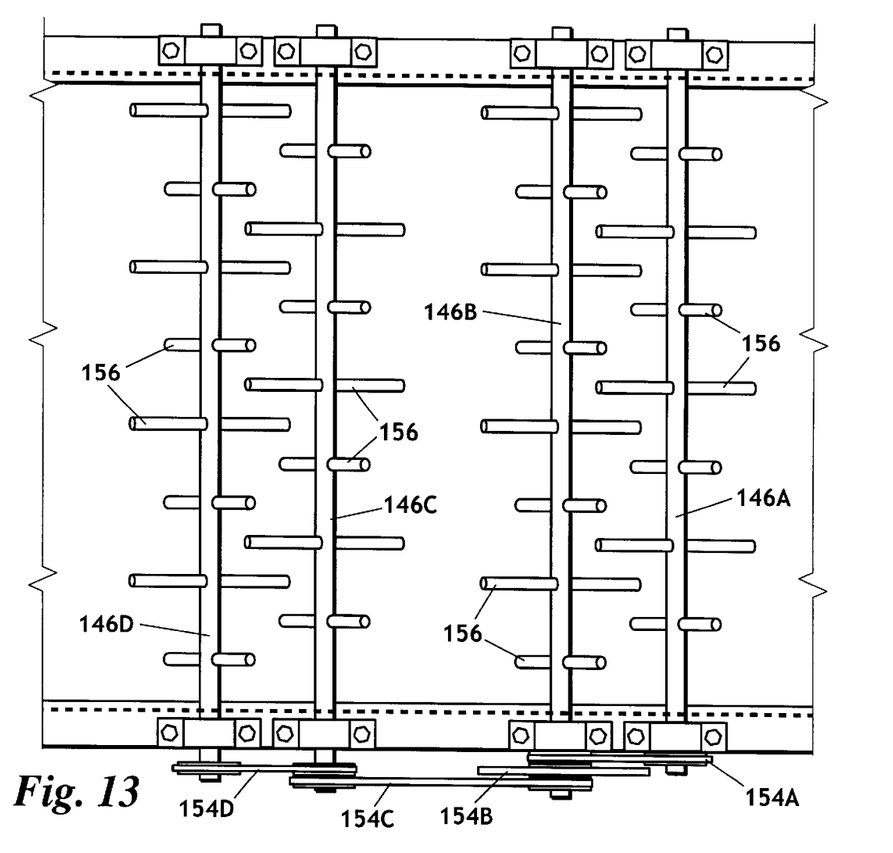
FIG. 13 is an enlarged top view of the agitator mechanism, taken along the line 13—13 of FIG. 12.

The details of construction of the agitator 144 are seen best in FIGS. 12 and 13. As shown in FIG. 12, there is affixed to the outer end of each of the shafts 146A–146D a pulley by which the shafts are rotated. Specifically, shaft 146A has a pulley 148A; shaft 146B has a pulley 148B; shaft 146C a pulley 148C and shaft 146D a pulley 148D. In addition to pulley 148B, there is affixed to shaft 146B a master pulley 150 that is driven by a belt 154A. Belts 154B, 154C and 154D intercouple the other pulleys so that all of the horizontal shafts 146A–146D rotate simultaneously.

Extending from the horizontal shafts are spaced apart arms 156 that serve to fluff and separate grass sprigs and loosen them so that they will pass downwardly into sprig storage bin 22.

Hydraulic motor 152 is driven by hydraulic fluid energy supplied from a tractor or other vehicle (not shown) that pulls the grass sprigger, such hydraulic energy being transmitted by the way of hydraulic hoses 158A and 158B.

Hydraulic motor 152 or a gearing mechanism attached to it, is designed and operated such that pulleys 154A–154D and thereby shafts 146A–146D operate first in one direction and then in the opposite direction to function therefore as an "agitator" or "fluffer" to separate and untangle the grass sprigs so that they move downwardly out of sprig bin 138 into a sprig storage bin 22. That is, it is not the function of agitator 144 to move the sprigs only in one direction towards either the front or the rear of sprig bin 138, but only to separate them so that they fall downwardly 146 into sprig storage bin 22.

Figure 11:
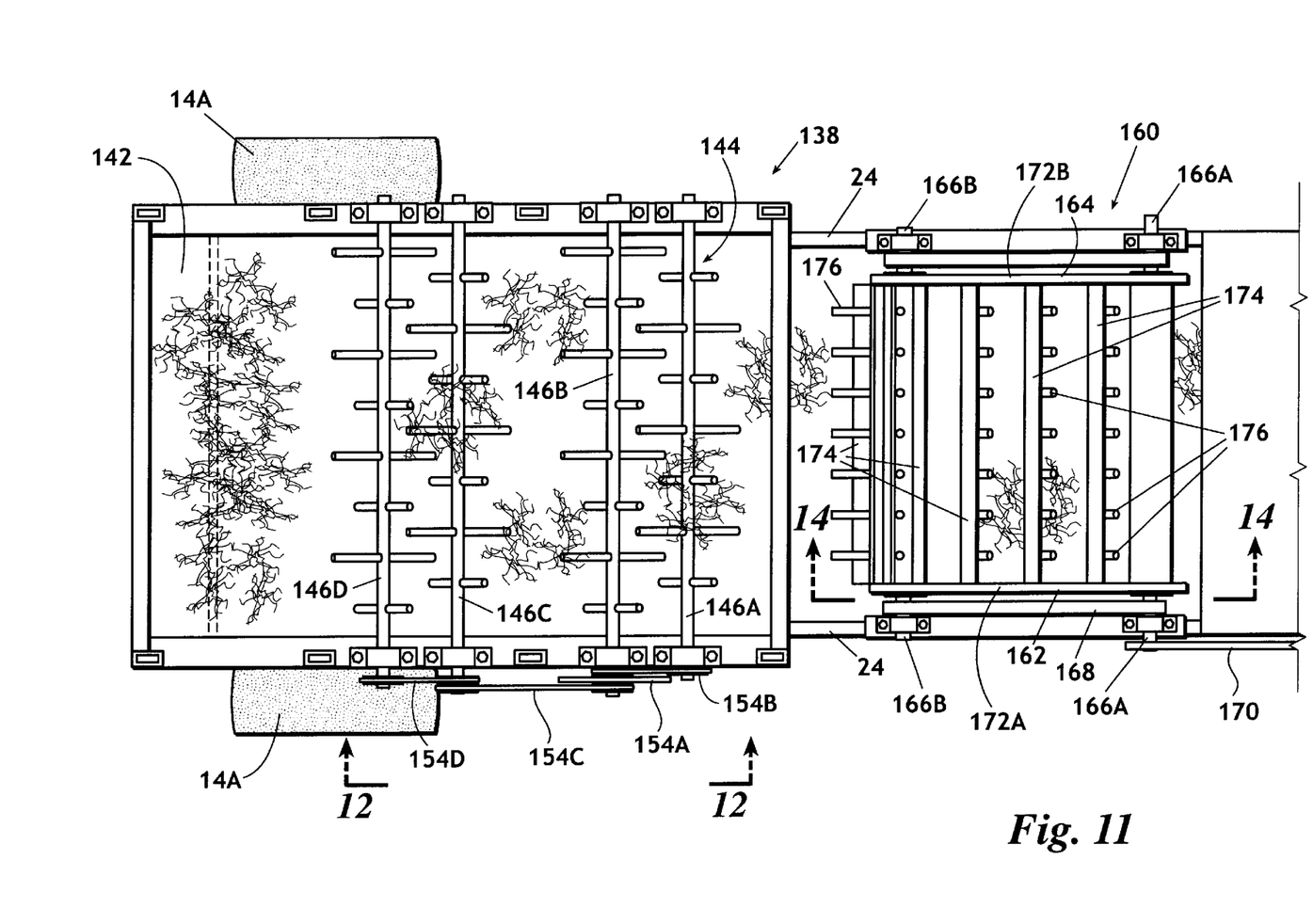
FIG. 11 is a partial top plan view as taken along the line 11—11 of FIG. 10 and shows a top view of the grass sprig bin and shows a top view of the agitator mounted within the sprig bin for distribution of grass out of the bin and downwardly into the sprig storage bin below. At a forward portion of FIG. 11, a supplemental sprig distributor that is included in the embodiment of FIG. 10 is shown.
Figure 14:
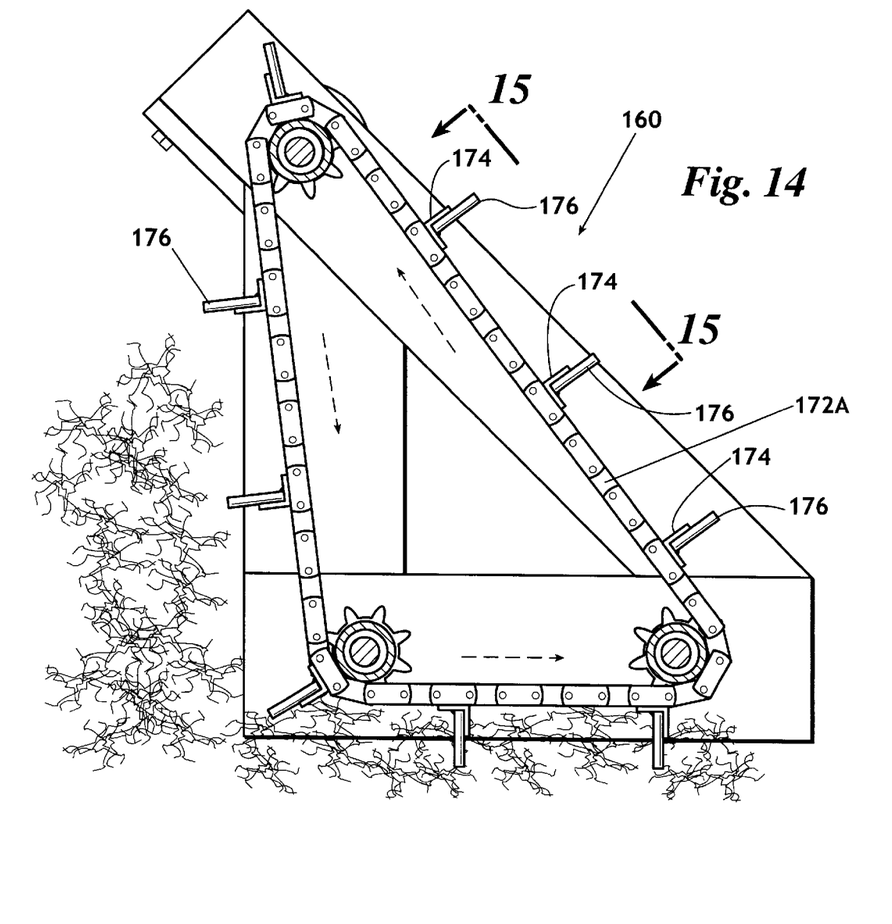
FIG. 14 is an elevational view of the supplemental distributor as taken along the line 14—14 of FIG. 11 showing the triangular relationship of the supporting structure that functions to move grass springs downwardly into the sprig storage bin and for ultimate distribution to the grass discharge troughs.
Figure 15:
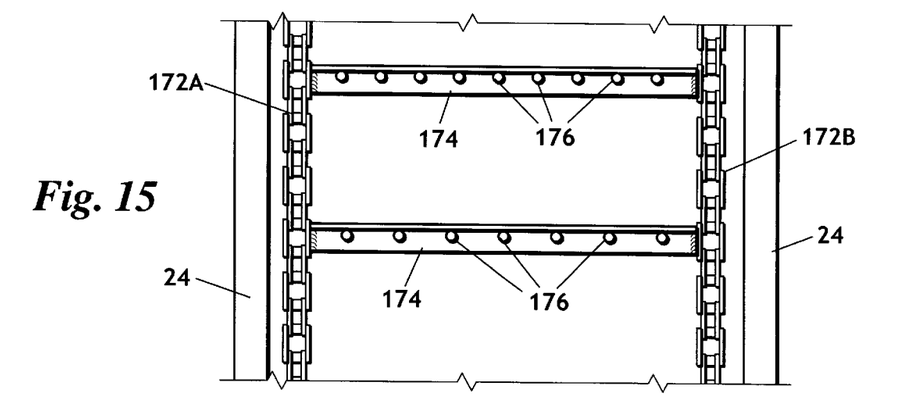
FIG. 15 is a fragmentary cross-sectional view taken along the line 15—15 of FIG. 4 showing the arrangement of the bars that extend from parallel chains to move grass sprigs downwardly towards the forward end of the sprig storage bin.

Another new element that is provided in the improved embodiment illustrated in FIGS. 10, 14 and 15 is a supplemental sprig distributor 160 that moves grass sprigs forwardly and downwardly within sprig storage bin 22 towards the area directly above sprig discharge troughs 38A–38D as seen best in FIG. 4. Supplemental sprig distributor 160 has opposed triangular shaped frames that are supported on opposite sides of sprig storage bin 22. Extending between the frames are three horizontal shafts 166A–166C. A pulley is affixed to one end of each of shafts 166A–166C, the pulleys being interlinked by a belt 168, as seen best in FIG. 11. A drive belt 170 extends from a shaft of the sprig distributors previously described so that the three shafts of supplemental sprig distributor 160 are simultaneously rotated, thereby rotating opposed chains 172A and 172B (see FIG. 15). Extending between chains 172A and 172B are spaced apart paralleled horizontal shafts 174. Extending from the shafts are radial arms 176 as seen in FIGS. 11, 14 and 15.

The function of supplemental sprig distributor 160 is to move grass sprigs downwardly and forwardly towards the open bottom of sprig storage bin 22 to cause the sprigs to fall downwardly into the grass discharge troughs and ultimately out onto the ground to be planted. Chains 172A and 172B rotate counterclockwise as seen in FIGS. 10 and 15.

The improvements provided by the embodiment of FIGS. 10–15 are concerned primarily with increasing the storage capacity of grass sprigs so that a greater area can be planted with one filling of the machine with grass sprigs. The improvements include an additional large sprig bin 138, an agitator 144 and a supplemental sprig distributor 160. Agitator 144 and supplemental sprig distributor work together to provide for more effective and consistent distribution of grass sprigs for discharging into the troughs which ultimately pass the grass sprigs downward into spaced apart narrow rows upon the earth where the sprigs can be forced into grooves formed in the earth to complete planting of the sprigs.

While the invention has been described with a certain degree of particularity, it is manifest that many changes may be made in the details of construction and the arrangement of components without departing from the spirit and scope of this disclosure. It is understood that the invention is not limited by the specific structures described herein, but is to be limited only by the scope of the attached claim or claims, including the full range of equivalency of each element thereof.

What is claimed is:

1. A machine for planting grass sprigs into the surface of the earth, comprising:
    a superstructure supported on wheels for moving over the surface of the earth and having a forward direction of travel;
    a sprig storage bin supported by said superstructure and having a discharge opening through which grass sprigs can fall;
    a distributor for moving grass sprigs contained within said storage bin towards said discharge opening;
    at least one grass discharge trough formed of a pair of spaced apart, wide downwardly inclined moving belts providing a relatively wide inlet space between belts at their upper ends and the belts tapering towards each other at their lower ends to provide a relatively narrow discharge slot that is in alignment with said superstructure direction of travel, the discharge slot being spaced in close proximity to the earth's surface, the inlet space between belts being positioned below and in close proximity to said discharge opening whereby springs from said sprig storage bin pass downwardly into said inlet space between said pair of belts of each discharge trough, are the sprigs being carried downwardly by the moving distributor belts to deposit grass sprigs in an inline pattern on the earth's surface;
    at least one trenching disc carried by said superstructure that forms a narrow trench in the earth's surface as moved along with said superstructure, the trench being formed in alignment with and in advance of, said inline pattern in which grass sprigs are deposited by said pair of distributor belts of said discharge trough whereby said pattern in which said grass sprigs are deposited is on top of the narrow trench formed by the trenching disc; and
    at least one planting disc carried by said superstructure that is in alignment and spaced rearwardly of said trenching disc and rearwardly of said inline pattern in which grass sprigs are deposited by said discharge trough the planting disc serving to force grass sprigs downwardly into said narrow trench formed by said trenching disc.

2. A machine for planting grass sprigs according to claim 1 including a plurality of discharge troughs each formed of a pair of said spaced apart moving belts serving to deposit grass sprigs in a plurality of inline spaced apart paralleled patterns on the earth's surface and including a trenching disc and a planting disc in alignment with each inline pattern of grass sprigs.

3. A machine for planting grass sprigs according to claim 1 wherein said discharge troughs, said trenching discs and said planting discs are all supported on a sprigger assembly that is elevationally positionable with respect to said superstructure.

4. A machine for planting grass sprigs according to claim 1 where at least one of each pair of moving belts of each discharge trough is resiliently laterally displaceable at its said lower end with respect to said lower end of the adjacent belt in said pair allowing said discharge slot between said lower ends of said moving belts to vary in width as required to pass rocks, clods of earth or sod.

5. A machine for planting grass sprigs according to claim 1 where at least one trenching disc is in the form of a primary trenching disc followed by an inline secondary trenching disc, the secondary trenching disc being positioned immediately in advance of said discharge trough.

6. A machine for planting grass sprigs according to claim 1 wherein said planting disc includes a plurality of in-line, spaced apart planting disc.

7. A machine for planting grass sprigs according to claim 6 wherein said plurality of in-line planting disc have circumferential edges that progressively penetrate deeper into the earth's surface.

8. A machine for planting grass sprigs according to claim 7 wherein one of said planting discs has, adjacent a circumferential edge thereof, a plurality of spaced apart smaller diameter rotatable discs affixed thereto.

9. A machine for planting grass sprigs into the surface of the earth, comprising:

a superstructure supported on wheels for moving over the surface of the earth and having a forward direction of travel;

a sprig storage bin supported by said superstructure and having an opening in a floor surface through which grass sprigs can fall;

a distributor for moving grass sprigs contained within said storage bin towards said floor surface opening;

a plurality of paralleled discharge troughs each having a wide upper open end for receiving grass sprigs therein from said sprig storage bin and a reduced width lower end providing a relatively narrow discharge slot through which grass sprigs are deposited in an in-line pattern on the earth's surface;

a plurality of paralleled trenching discs, each in alignment with and forwardly of a said discharge trough for forming a narrow trench in the earth's surface upon which grass sprigs are deposited from said discharge troughs; and a plurality of planting discs, each in alignment with and rearwardly of a said discharge trough for forcing grass sprigs into said narrow trenches.

* * * * *